United States Patent
Papageorgiou et al.

(10) Patent No.: US 7,308,124 B2
(45) Date of Patent: Dec. 11, 2007

(54) CORRECTION OF BOUNDARY ARTEFACTS IN IMAGE DATA PROCESSING

(75) Inventors: Pavlos Papageorgiou, Edinburgh (GB); Ian Poole, Edinburgh (GB)

(73) Assignee: Barcoview Mis Edinburgh, Bonnington Bond (GB)

( * ) Notice: Subject to any disclaimer, the term of this patent is extended or adjusted under 35 U.S.C. 154(b) by 664 days.

(21) Appl. No.: 10/474,861

(22) PCT Filed: Feb. 21, 2002

(86) PCT No.: PCT/GB02/00768

§ 371 (c)(1),
(2), (4) Date: Oct. 13, 2003

(87) PCT Pub. No.: WO02/084594

PCT Pub. Date: Oct. 24, 2002

(65) Prior Publication Data

US 2004/0114787 A1     Jun. 17, 2004

(30) Foreign Application Priority Data

Apr. 18, 2001  (GB) ................ 0109524.9

(51) Int. Cl.
*G06K 9/00* (2006.01)
(52) U.S. Cl. .............. 382/128; 382/154; 378/21
(58) Field of Classification Search ........... 382/128, 382/129, 130, 131, 132, 133, 168, 254, 274, 382/275, 305, 308, 154, 172, 181, 189, 193, 382/232, 267, 276; 600/414, 425, 420; 702/159; 378/21, 23

See application file for complete search history.

(56) References Cited

U.S. PATENT DOCUMENTS 5,619,592 A * 4/1997 Bloomberg et al. ......... 382/175

(Continued)

FOREIGN PATENT DOCUMENTS

EP        1 045 340        10/2000

(Continued)

OTHER PUBLICATIONS

Dai, M. et al. "Image segmentation by a dynamic thresholding using edge detection based on cascaded uniform filters." *Signal Processing.* 52.1 (1996): 49-63.

(Continued)

*Primary Examiner*—Seyed Azarian
(74) *Attorney, Agent, or Firm*—Renner, Otto, Boisselle & Sklar, LLP

(57) ABSTRACT

An image processing system in which sets of image elements having display values outside of a target range B of display values are each respectively morphologically dilated. The intersection between the morphologically dilated sets of image elements is then identified and those image elements within the intersecting region are removed from the set of image elements having the target range B of display values. This removes image elements incorrectly appearing to have display values corresponding to the target range B of display values due to aliasing effects between regions of image elements having display values either side of the target range B of image values. The imaging may be two-dimensional or three-dimensional imaging. The morphological dilatation is preferably performed with a quasi-circular or a quasi-spherical structuring element having a radius of between two and three voxels.

33 Claims, 7 Drawing Sheets

U.S. PATENT DOCUMENTS

| | | | |
|---|---|---|---|
| 5,647,360 A * | 7/1997 | Bani-Hashemi et al. | 600/425 |
| 5,769,789 A * | 6/1998 | Wang et al. | 600/414 |
| 5,953,461 A * | 9/1999 | Yamada | 382/266 |
| 6,463,168 B1 * | 10/2002 | Alyassin et al. | 382/131 |
| 6,535,835 B1 * | 3/2003 | Rubin et al. | 702/159 |
| 7,069,068 B1 * | 6/2006 | Ostergaard | 600/420 |

FOREIGN PATENT DOCUMENTS

| | | |
|---|---|---|
| WO | 00/14968 | 3/2000 |

OTHER PUBLICATIONS

"Edge Class Training for Supervised Image Segmentation." *IBM Technical Disclosure Bulletin*. 34.1 (1991): 417-419.

Jeffcoat, M.K. et al. "A Morphologically Aided Technique for Quantitative Subtraction of Dental Radiographic Images." *Engineering in Medicine and Biology Society*. (1990): 2068-2070.

Revol, Chantal et al. "A new minimum variance region growing algorithm for image segmentation." *Pattern Recognition Letters*. 18.3 (1997): 249-258.

* cited by examiner $$D_b = T(B_{min}, B_{max}) - [(T(B_{max}+1, \infty) \oplus S) \cap (T(-\infty, B_{min}-1) \oplus S)]$$

where:

$T(a,b)$ indicates the set of points between densities $a$ and $b$ inclusive $x \oplus y$ is the morphological dilation of domain $x$ by domain $y$ $x \cap y$ is the intersection of domains $x$ and $y$ $x$-$y$ is set difference

Fig. 5

CORRECTION OF BOUNDARY ARTEFACTS IN IMAGE DATA PROCESSING

FIELD OF THE INVENTION

This invention relates to the field of image data processing. More particularly, this invention relates to the display of image elements having display values lying within a range of display values located within a broader overall range of display values.

BACKGROUND ART

It is known to provide image display systems in which image elements, whether they are representing a two-dimensional image or a three-dimensional image, are displayed to a user with a selection and modified processing of at least some of the image elements being made in dependence upon the display values for those image elements. In certain cases, these image elements are directly related to a physical characteristic of an object through the measurement of signal strength values from a defection device. As an example, in medical imaging applications signal values representing the signals returned from CAT scanning or MRI scanning may be displayed with display elements having their intensity or colour controlled by the value of the signal returned for each particular image element. In order to improve the ease of interpretation of such images it is known to map different colours to different ranges of display value such that particular features, e.g. blood vessels, may be made more visible within the image.

A particular problem arises when it is desired to selectively process or display those image elements falling within a range of display values that is itself located within a broader full range of display values for the image as a whole. FIG. 1 of the accompanying drawings illustrates such an image. The image contains a region 2 of image elements having high display values, such as a region of bone within a medical image. This region 2 having high display values is located within an overall background 4 of image elements having low display values, such as image elements representing soft tissue. Also present within this image is a blood vessel 6 containing a contrast enhancing agent that is represented by image elements having display values located somewhere between the high values of the bone region 2 and the low values of the background soft tissue region 4.

FIG. 2 of the accompanying drawings illustrates the problem that occurs due to the finite resolution of real imaging systems in that at the interface between the bone region 2 and the soft tissue 4 there is a boundary formed of pixels having values lying somewhere between the high values of the bone region 2 and the low values of the soft tissue region 4. In many cases, these boundary pixels will have display values closely similar to the display values corresponding to the blood vessel 6. Accordingly, if the image of FIG. 2 is processed to enhance the appearance, or otherwise select in some way, the display elements having display values corresponding to the blood vessels 6, then this will erroneously also highlight a region at the interface between the bone region 2 and the soft tissue 4 that due to aliasing effects appears to have the appropriate display value.

SUMMARY OF THE INVENTION

Viewed from one aspect the present invention provides a method of processing image data formed of an array of image elements, each image element having a display value, said method comprising the steps of:

identifying a set of target image elements having display values within a target range of display values from $B_{min}$ to $B_{max}$;

identifying a set of low display value image elements having display values below $T_{min}$;

identifying a set of high display value image elements having display values above $T_{max}$;

applying a morphological dilation to said set of low display value image elements to generate a dilated set of low display value image elements;

applying a morphological dilation to said set of high display value image elements to generate a dilated set of high display value image elements;

identifying an intersection set of image elements that are present in both said dilated set of low display value image elements and said dilated set of high display value image elements; and removing from said set of target image elements any image elements also present within said intersection set of image elements to form a modified set of target image elements.

The invention recognises that the image elements that are incorrectly appearing to have display values corresponding to the target range of display values occur at the interfaces between regions of image elements with display values at opposite sides of the target range and if these interface image elements can be reliably identified, then they may be removed. The invention identifies such interface image elements by morphologically dilating the regions (i.e. sets of image elements) at either side of the target region and then determining the intersection of those dilated regions. The dilated regions will intersect where they touch one another and accordingly this technique selectively identifies the interface regions rather than picking up image elements that lie at an interface between the target region and a region of image elements having display values outside of the target range. When these interface image elements have been identified, they may be removed from the set of image elements having a display value within the target range and the modified set of image elements having the target display value can then be displayed with reduced interface aliasing artefacts or in some other way processed, e.g. volume measured.

The technique of the invention is able to identify and remove the image elements producing the erroneous artefacts within the image without significantly impacting the display of image elements that are correctly identified. By comparison, a technique that merely morphologically expanded either the high display value region or the low display value region to overwrite any interface image elements would also be likely to overwrite the edges or the fine detail in the display of the regions image elements that correctly have the target range of display values, e.g. fine capillaries may be lost from the image.

It will be appreciated that the technique described above could be applied to both two dimensional images and three dimensional images. The invention is particularly well suited to use within imaging arrays of three dimensional voxel data as such images can be significantly degraded by the aliasing artefacts between regions as discussed above.

The morphological dilatation could take a variety of forms depending upon the particular circumstances, but preferably has the form of a spherical morphological dilatation whereby each voxel is projected onto all the points within a quasi spherical surrounding region.

The spherical structuring element used in this morphological dilatation could have a variety of sizes, but the invention has been found to be particularly effective when the structuring element has a radius of between 2 and 3 voxel sizes, and more preferably substantially 2.5 voxel sizes.

It will be appreciated that the image elements have associated display values that correspond to the ranges being identified and are used to control the way in which those image elements are displayed. In preferred practical systems, the display values do not correspond to what would normally be regarded as visual properties, such as colour or intensity, but instead relate to detected signal values from measuring systems such as CAT scanners, and MRI scanners, ultrasound scanners and PET systems.

The invention is particularly well suited to the removal of artefacts from images when attempting to discriminate between blood vessels containing contrast enhancing agents, soft tissue and bone within a medical diagnostic, such as angiogram, image.

Other aspects of this invention provide apparatus for processing image data and a computer program for controlling a computer to process image data in accordance with the above described techniques.

BRIEF DESCRIPTION OF THE DRAWINGS

An embodiment of the invention will now be described, by way of example only, with reference to the accompanying drawings in which:

FIG. 5 is a mathematical representation of the processing of FIG. 4;

DETAILED DESCRIPTION

Image data, such as a collection of say 100 two-dimensional 512*512 images collected from a CAT scanner, a MRI scanner, an ultrasound scanner or a PET (Positron emission tomography system), may be subject to image processing in accordance with known techniques to produce a three-dimensional representation of the structure imaged (various user selected two-dimension projections of the three-dimensional representation are typically displayed on a computer monitor). The techniques for generating such three-dimensional representations of structures from collections of two-dimensional images are known in themselves and will not be described further herein.

In order to increase the understandability of the three-dimensional representations generated it is known to select ranges of display values for highlighting or selective processing in some other way. As an example, voxels having a particular range of display value may be tinted with a vivid colour to stand out within the image or may be selected for removal from the image to reveal other more interesting features.

Figure 1:
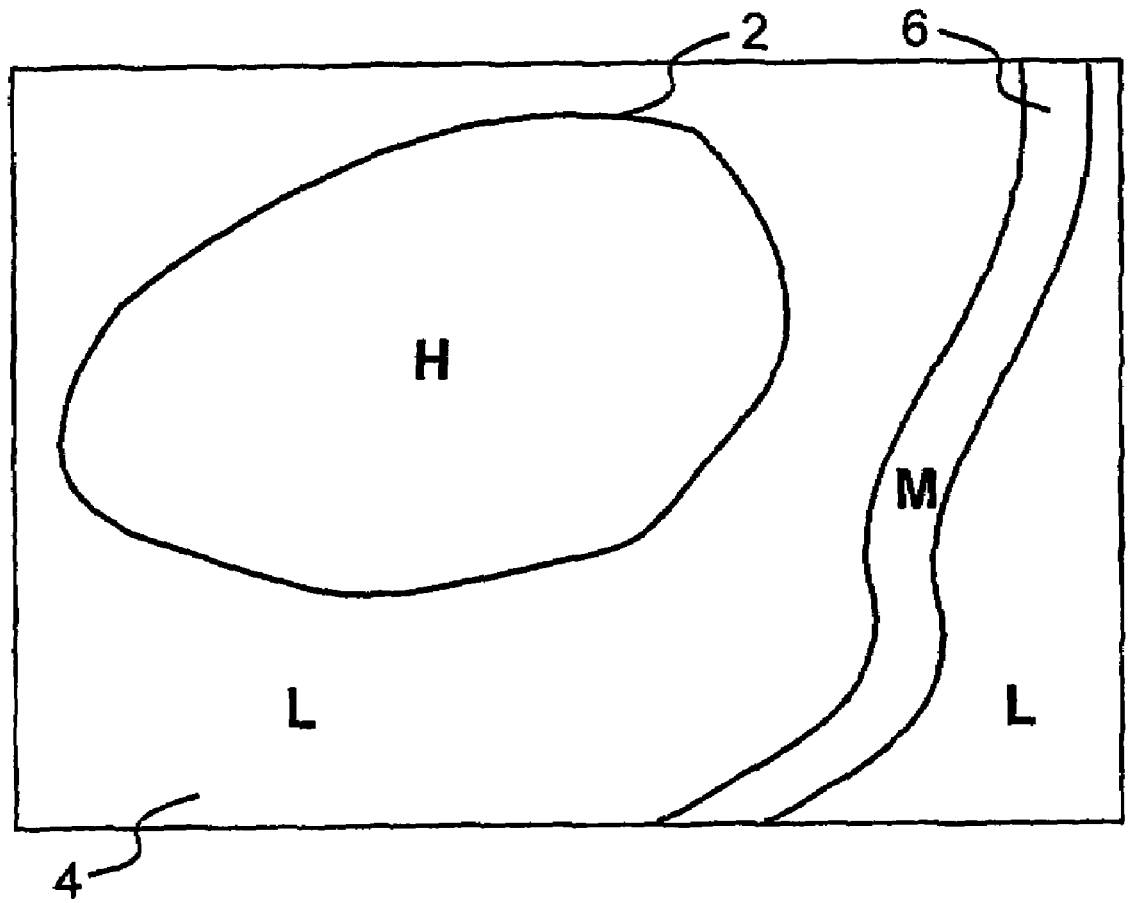
FIG. 1 schematically illustrates an image having regions corresponding to different display values.
Figure 2:
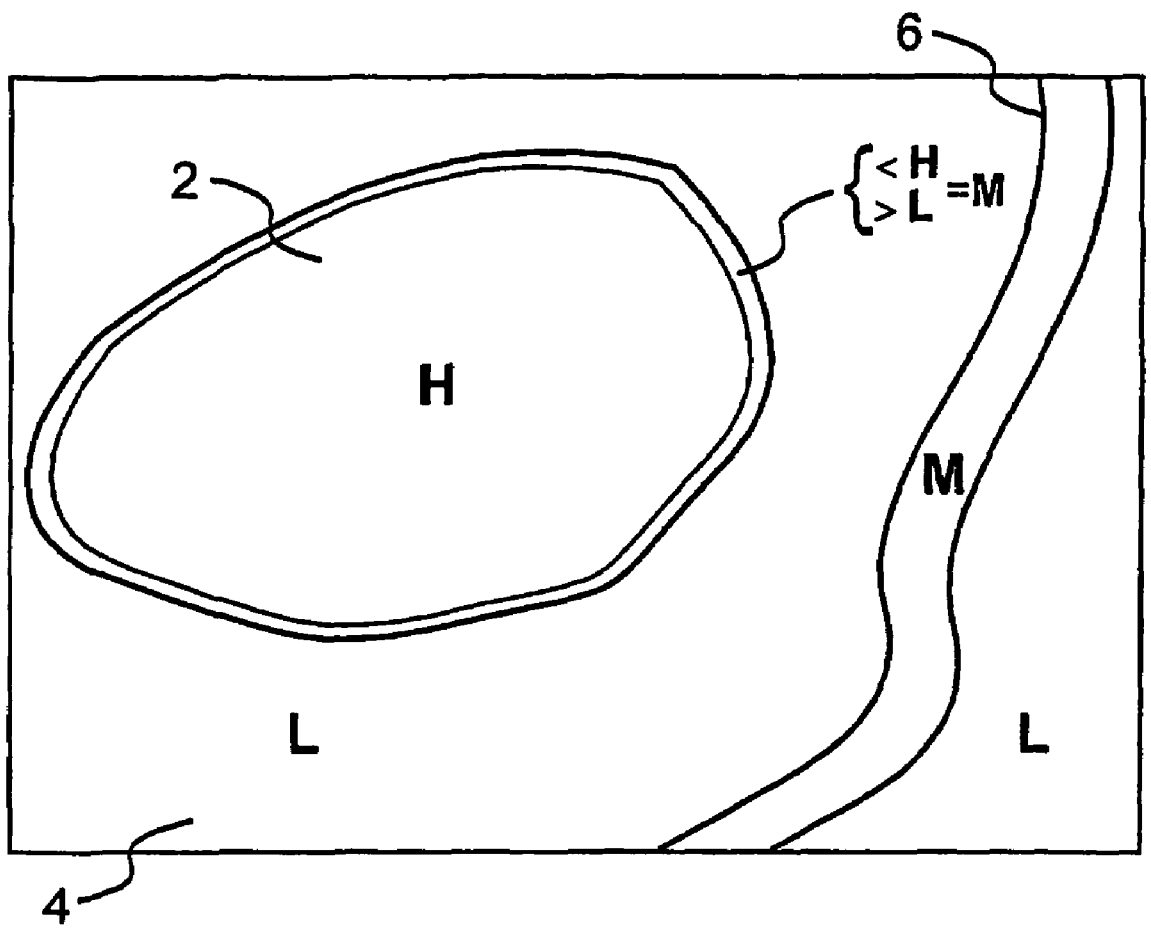
FIG. 2 schematically illustrates the image of FIG. 1 showing the aliasing artefacts that can arise.
Figure 3:
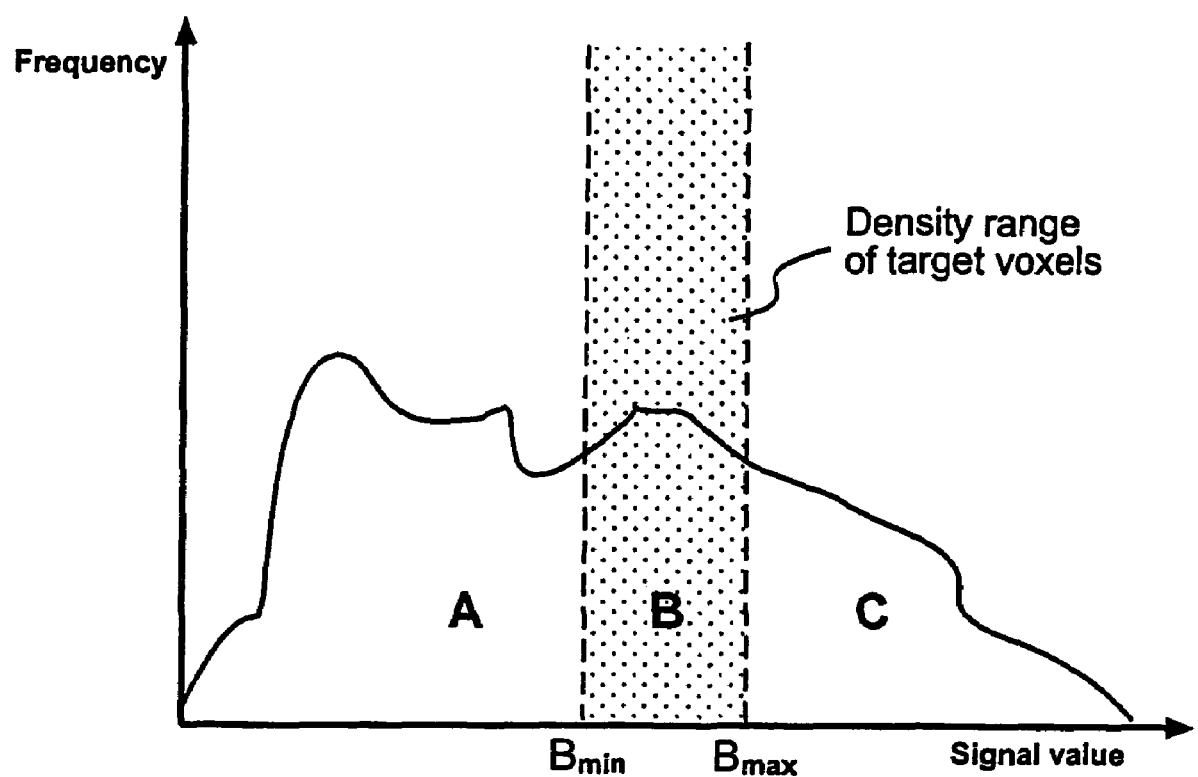
FIG. 3 schematically illustrates the selection of a target range of display values to highlight within an image.

FIG. 3 is a histogram illustrating the frequency of occurrence of voxels within an image as a function of the signal value associated with those voxels. As illustrated in FIG. 3, there is a target range B of interest that may have its upper $B_{max}$ and lower $B_{min}$ boundaries selected by the user. The user may select this range to try to pick out blood vessels containing a contrast enhancing agent, such as maybe desired when performing angiography. This target region is positioned within the broader full range of signal values that may be generated with a lower signal value range A bounding the target range B on its lower side. Similarly, a higher value range C bounds the target range B on its higher side. As previously discussed, a problem can arise when tissue that returns a signal value within the range A abuts tissue that returns a signal value within the range C as the spatial resolution of the system and the consequences of finite resolution sampling may result in an image element, voxel, being generated at this interface with a signal value corresponding to the range B even though this is not truly a blood vessel region that it is desired to highlight.

Figure 4:
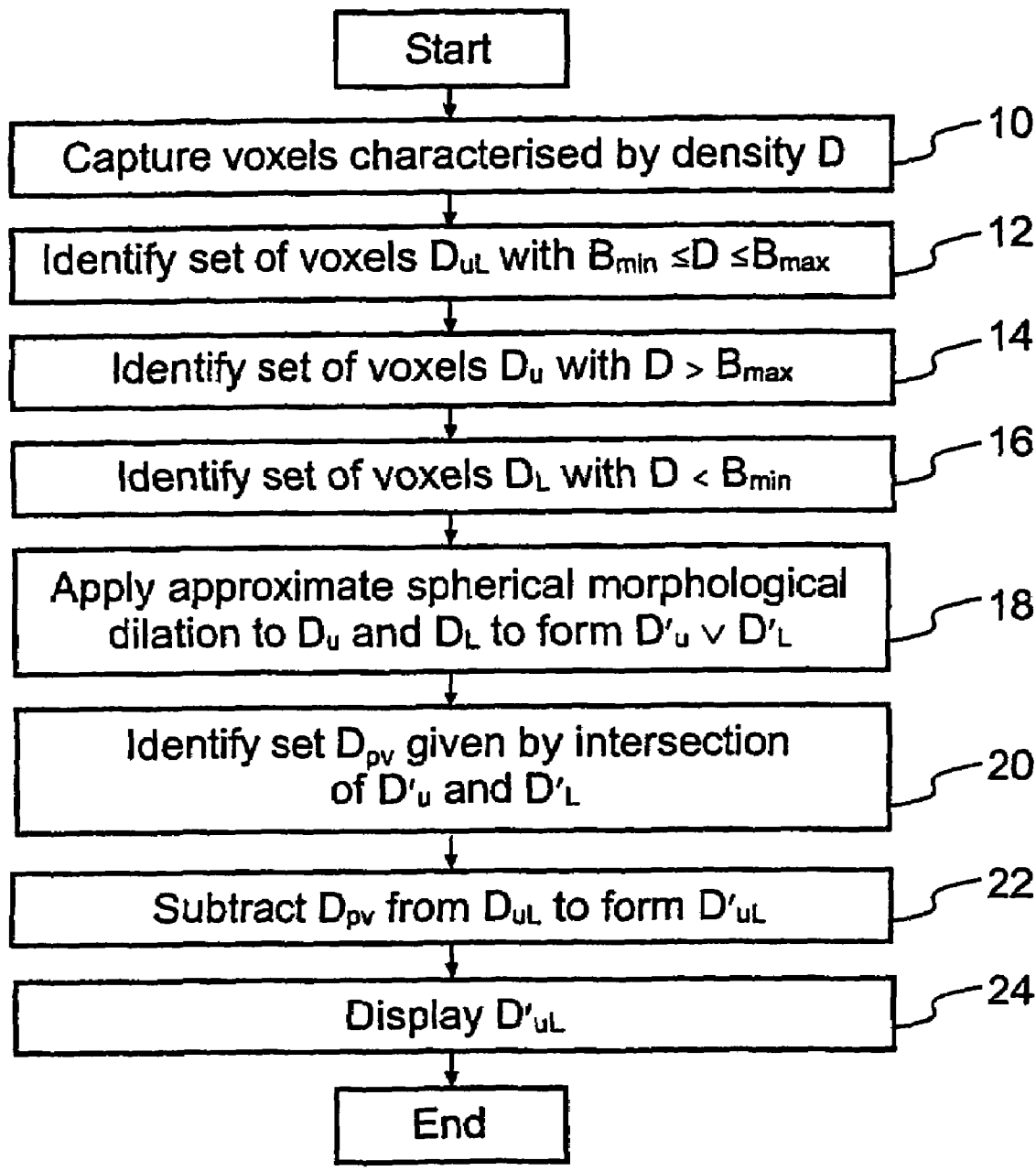
FIG. 4 is a flow diagram illustrating a technique for removing artefacts from an image such as that shown in FIG. 2.

FIG. 4 is a flow diagram illustrating the artefact removal technique. At step 10, the voxels that are to form the image are captured with each one having a corresponding display value, in this case the display values are representative of signal strength values from a detection device, and indicate a density value D. At step 12, the set of voxels having a density within the user specified target range B of density values illustrated in FIG. 3 is identified. At step 14, the set of voxels having a density corresponding to the range C of FIG. 3 is identified. At step 16, the set of voxels having a density corresponding to the range A of FIG. 3 is identified.

The sets of voxels identified at steps 14 and 16 are then subject to respective spherical morphological, dilatation to produce dilated sets of voxels. The morphological dilatation can take a variety of forms, but in this example uses a quasi-spherical structuring element based upon a voxel approximation to a sphere having a radius of between 2 and 3 voxels, but preferably substantially 2.5 voxels. The morphological dilatation with such a spherical structure acts to project each voxel value onto all of the voxels within a region surrounding the starting voxel defined by the spherical structure. This slightly expands/dilates the region concerned.

At step 20, the two dilated sets of image elements are compared to identify image elements appearing within both sets. These image elements correspond to the interface regions between the two sets. These interface regions are the place where voxels incorrectly aliased so that they appear to be within the target range B may appear. Accordingly, the set of target voxels identified at step 12 is compared with this intersecting set of voxels identified at step 20 and any voxels that appear in both sets are removed from the set of voxels identified at step 12. This occurs at step 22. At step 24, the resulting set of target voxels having the interface artefact removed from them are displayed.

FIG. 5 is a mathematical representation of the processing that occurs in accordance with the flow diagram of FIG. 4.

Figure 6:
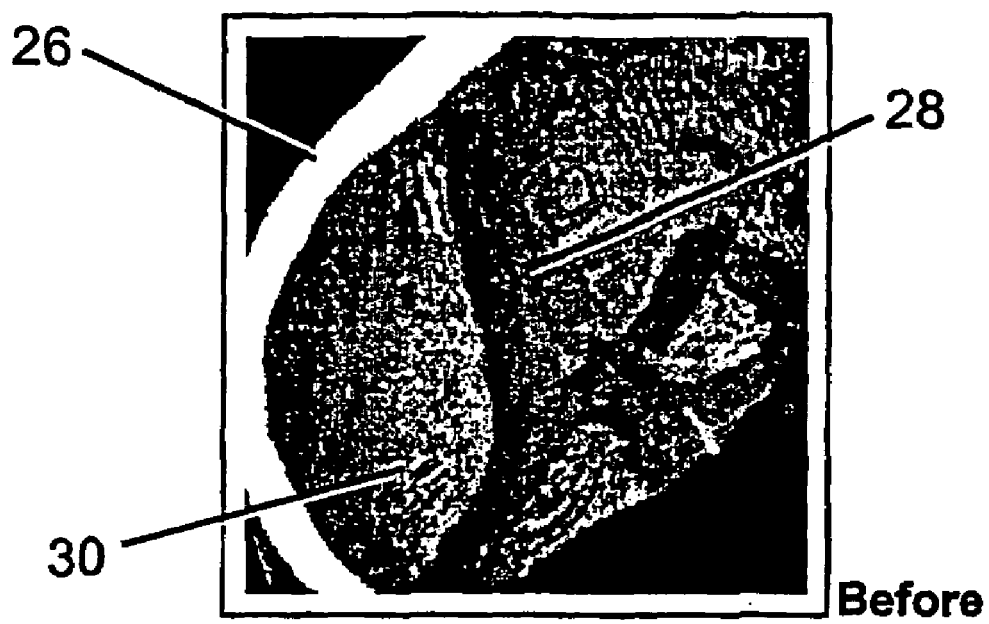
FIG. 6 illustrates an image both before and after the removal of the artefacts described above.
Figure 6:

FIG. 6 illustrates a Before image in which the artefact is present and an After image in which the artefact is not present. Each image contains a region of bone 26, blood vessels 28 and a soft tissue region 30. In the Before image, the interface between the soft tissue region 30 and the bone 26 aliases to display values similar to those of the blood vessels 28 and accordingly this interface region is tinted in the same way as the blood vessel 28 making the image more difficult to interpret. The After image shows the effect of applying the above technique to removing this artefact. This artefact is removed without inappropriately changing the shape of the regions appearing within the image and without the possibility of obliterating fine detail that may occur by simply dilating one region outside of the target range.

Figure 7:
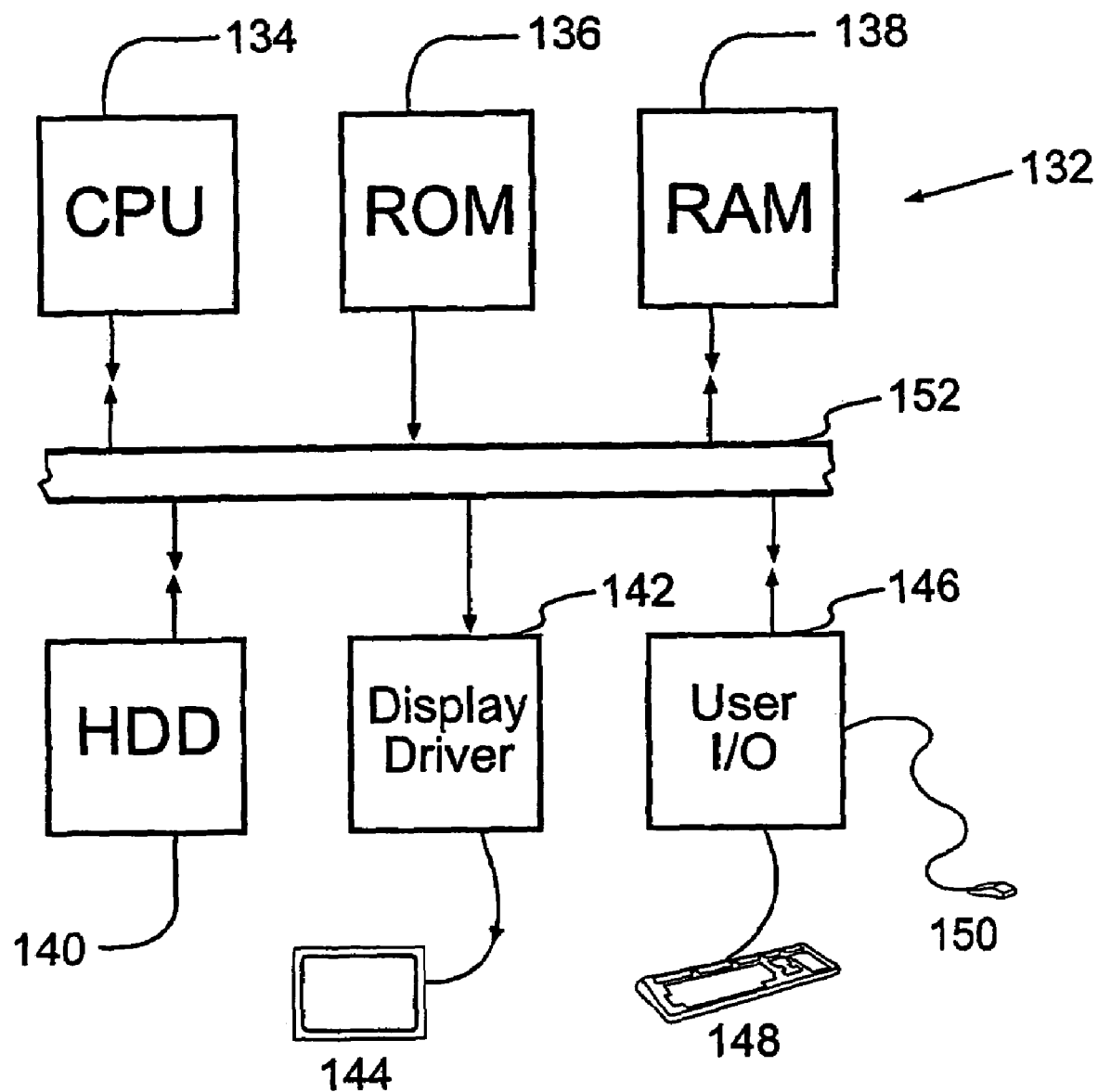
FIG. 7 schematically illustrates a general purpose computer of the type that may be used to carry out processing in accordance with the above techniques.

FIG. 7 schematically illustrates a general purpose computer 132 of the type that may be used to perform processing in accordance with the above described techniques. The computer 132 includes a central processing unit 134, a read only memory 136, a random access memory 138, a hard disk drive 140, a display driver 142 and display 144 and a user input/output circuit 146 with a keyboard 148 and mouse 150 all connected via a common bus 152. The central processing unit 134 may execute program instructions stored within the ROM 136, the RAM 138 or the hard disk drive 140 to carry out processing of data values that may be stored within the RAM 138 or the hard disk drive 140. Data values may represent the image data described above and the processing may carry out the steps illustrated in FIG. 4 and as expressed mathematically in FIG. 5. The program may be written in a wide variety of different programming languages. The computer program itself may be stored and distributed on a recording medium, such as a compact disc, or may be downloaded over a network link (not illustrated). The general purpose computer 132 when operating under control of an appropriate computer program effectively forms an apparatus for processing image data in accordance with the above described technique. The general purpose computer 132 also performs the method as described above and operates using a computer program product having appropriate code portions (logic) for controlling the processing as described above.

The invention claimed is:

1. A method of processing image data formed of an array of image elements, each image element having a display value, said method comprising the steps of:

identifying a set of target image elements having display values within a target range of display values from $B_{min}$ to $B_{max}$;

identifying a set of low display value image elements having display values below $B_{min}$;

identifying a set of high display value image elements having display values above $B_{max}$;

applying a morphological dilation to said set of low display value image elements to generate a dilated set of low display value image elements;

applying a morphological dilation to said set of high display value image elements to generate a dilated set of high display value image elements;

identifying an intersection set of image elements that are present in both said dilated set of low display value image elements and said dilated set of high display value image elements; and removing from said set of target image elements any image elements also present within said intersection set of image elements to form a modified set of target image elements.

2. A method as claimed in claim 1, wherein said image elements are voxels and said array is a three dimensional array of voxels.

3. A method as claimed in claim 2, wherein said morphological dilation applied to said set of low display value image elements uses a quasi-spherical structuring element.

4. A method as claimed in claim 2, wherein said morphological dilations applied to said set of low display value image elements and said set of high display value image elements use quasi-spherical structuring elements.

5. A method as claimed in claim 3, wherein said quasi-spherical structuring element has a radius of between 2 and 3 voxels.

6. A method as claimed in claim 5, wherein said quasi-spherical structuring element has a radius of substantially 2.5 voxels.

7. A method as claimed in claim 1, wherein said display values represent a measured signal strength value returned from a portion of a subject being imaged mapped to a corresponding image element.

8. A method as claimed in claim 7, wherein said measured signal strength values are detected using one of:
CAT scanning; and
MRI scanning;
ultrasound scanning; and
PET.

9. A method as claimed in claim 1, wherein said set of low value image elements correspond to soft tissue, said set of high value image elements correspond to bone and said target set of image elements correspond to blood vessels containing a contrast enhancing agent.

10. Apparatus for processing image data formed of an array of image elements, each image element having a display value, said apparatus comprising:

a target set identifier operable to identify a set of target image elements having display values within a target range of display values from $B_{min}$ to $B_{max}$;

a low display value set identifier operable to identify a set of low display value image elements having display values below $B_{min}$;

a high display value set identifier operable to identify a set of high display value image elements having display values above $B_{max}$;

a low set dilator operable to apply a morphological dilation to said set of low display value image elements to generate a dilated set of low display value image elements;

a high set dilator operable to apply a morphological dilation to said set of high display value image elements to generate a dilated set of high display value image elements;

an intersection identifier operable to identifying an intersection set of image elements that are present in both said dilated set of low display value image elements and said dilated set of high display value image elements; and an intersection remover operable to remove from said set of target image elements any image elements also present within said intersection set of image elements to form a modified set of target image elements.

11. Apparatus as claimed in claim 10, wherein said image elements are voxels and said array is a three dimensional array of voxels.

12. Apparatus as claimed in claim 11, wherein said morphological dilation applied to said set of low display value image elements uses a quasi-spherical structuring element.

13. Apparatus as claimed in claim 11, wherein said morphological dilations applied to said set of low display value image elements and said set of high display value image elements use quasi-spherical structuring elements.

14. Apparatus as claimed in claim 12, wherein said quasi-spherical structuring element has a radius of between 2 and 3 voxels.

15. Apparatus as claimed in claim 14, wherein said quasi-spherical structuring element has a radius of substantially 2.5 voxels.

16. Apparatus as claimed in claim 10, wherein said display values represent a measured signal strength value returned from a portion of a subject being imaged mapped to a corresponding image element.

17. Apparatus as claimed in claim 16, wherein said measured signal strength values are detected using one of:
 CAT scanning;
 MRI scanning;
 ultrasound scanning; and
 PET.

18. Apparatus as claimed in claim 10, wherein said set of low value image elements correspond to soft tissue, said set of high value image elements correspond to bone and said target set of image elements correspond to blood vessels containing a contrast enhancing agent.

19. A computer program product comprising a computer-readable medium containing computer program code operable to control a computer to process image data formed of an array of image elements, each image element having a display value, said computer program code comprising:
 target set identifying logic operable to identify a set of target image elements having display values within a target range of display values from $B_{min}$ to $B_{max}$;
 low display value set identifying logic operable to identify a set of low display value image elements having display values below $B_{min}$;
 high display value set identifying logic operable to identify a set of high display value image elements having display values above $B_{max}$;
 low set dilating logic operable to apply a morphological dilation to said set of low display value image elements to generate a dilated set of low display value image elements;
 high set dilating logic operable to apply a morphological dilation to said set of high display value image elements to generate a dilated set of high display value image elements;
 intersection identifying logic operable to identifying an intersection set of image elements that are present in both said dilated set of low display value image elements and said dilated set of high display value image elements; and
 intersection removing logic operable to remove from said set of target image elements any image elements also present within said intersection set of image elements to form a modified set of target image elements.

20. A computer program product as claimed in claim 19, wherein said image elements are voxels and said array is a three dimensional array of voxels.

21. A computer program product as claimed in claim 20, wherein said morphological dilation applied to said set of low display value image elements uses a quasi-spherical structuring element.

22. A computer program product as claimed in claim 20, wherein said morphological dilations applied to said set of low display value image elements and said set of high display value image elements use quasi-spherical structuring elements.

23. A computer program product as claimed in claim 21, wherein said quasi-spherical structuring element has a radius of between 2 and 3 voxels.

24. A computer program product as claimed in claim 23, wherein said quasi-spherical structuring element has a radius of substantially 2.5 voxels.

25. A computer program product as claimed in claim 19, wherein said display values represent a measured signal strength value returned from a portion of a subject being imaged mapped to a corresponding image element.

26. A computer program product as claimed in claim 25, wherein said measured signal strength values are detected using one of:
 CAT scanning;
 MRI scanning;
 ultrasound scanning; and
 PET.

27. A computer program product as claimed in claim 19, wherein said set of low value image elements correspond to soft tissue, said set of high value image elements correspond to bone and said target set of image elements correspond to blood vessels containing a contrast enhancing agent.

28. A method as claimed in claim 4, wherein said quasi-structural structuring elements have radii of between 2 and 3 voxels.

29. A method as claimed in claim 28, wherein said quasi-spherical structuring elements have radii of substantially 2.5 voxels.

30. Apparatus as claimed in claim 13, wherein said quasi-structural structuring elements have radii of between 2 and 3 voxels.

31. Apparatus as claimed in claim 30, wherein said quasi-spherical structuring elements have radii of substantially 2.5 voxels.

32. A computer program product as claimed in claim 22, wherein said quasi-structural structuring elements have radii of between 2 and 3 voxels.

33. A computer program product as claimed in claim 32, wherein said quasi-spherical structuring elements have radii of substantially 2.5 voxels.

* * * * *